(12) United States Patent
Usami

(10) Patent No.: US 12,214,594 B2
(45) Date of Patent: Feb. 4, 2025

(54) CONTROLLER, HEAD SYSTEM, AND PRINTER

(71) Applicant: BROTHER KOGYO KABUSHIKI KAISHA, Nagoya (JP)

(72) Inventor: Hajime Usami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 141 days.

(21) Appl. No.: 17/935,413

(22) Filed: Sep. 26, 2022

(65) Prior Publication Data

US 2023/0166509 A1 Jun. 1, 2023

(30) Foreign Application Priority Data

Nov. 30, 2021 (JP) ................. 2021-194273

(51) Int. Cl.
*B41J 2/15* (2006.01)
*B41J 2/045* (2006.01)
*B41J 2/155* (2006.01)
*B41J 2/14* (2006.01)

(52) U.S. Cl.
CPC ...... *B41J 2/155* (2013.01); *B41J 2002/14491* (2013.01)

(58) Field of Classification Search
CPC .............. B41J 2002/14491; B41J 2/155; B41J 2/04501; B41J 2/04541
See application file for complete search history.

(56) References Cited

U.S. PATENT DOCUMENTS

2007/0279449 A1 12/2007 Mori et al.
2021/0229430 A1 7/2021 Rossi et al.

FOREIGN PATENT DOCUMENTS

| JP | 9-141975 A | 6/1997 |
| JP | 2006-7504 A | 1/2006 |
| JP | 2008-012909 A | 1/2008 |
| JP | 2009-003323 A | 1/2009 |
| JP | 2017-167241 A | 9/2017 |
| JP | 2021-028131 A | 2/2021 |
| WO | 2009-128351 A1 | 10/2009 |

OTHER PUBLICATIONS

Office Action issued in corresponding Japanese Application No. 2021-194273, Feb. 6, 2024.

*Primary Examiner* — Jason S Uhlenhake
(74) *Attorney, Agent, or Firm* — Merchant & Gould P.C.

(57) ABSTRACT

A controller includes a plurality of control circuits configured to be connected to respective ones of a plurality of head units. Each head unit has a nozzle. The plurality of control circuits includes a first control circuit, a second control circuit connected to the first control circuit in series to perform communication, and a third control circuit connected to the second control circuit in series to perform communication. The first control circuit is configured to transmit first data to the second control circuit. The first data is data for controlling at least one of the plurality of head units. The second control circuit is configured to transmit second data to the third control circuit. The second data is data for controlling at least one of the plurality of head units. A data amount of the second data is smaller than a data amount of the first data.

14 Claims, 9 Drawing Sheets

FIG. 4A  IMAGE DATA OF ONE PACKET
HEADER BITS | DATA BITS
FIG. 4B  IMAGE DATA RECEIVED BY SoC(1)
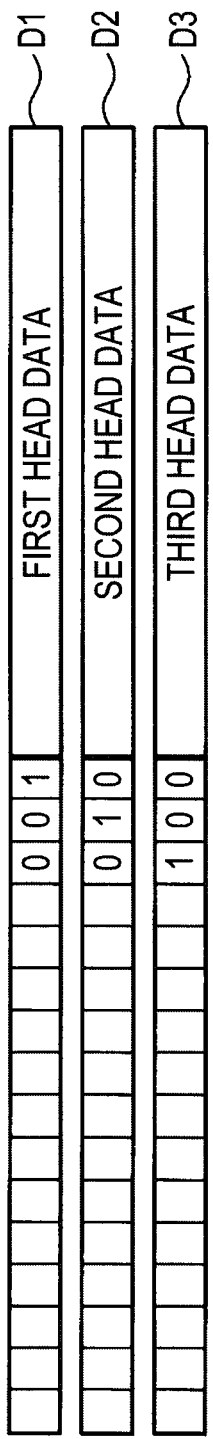
0 0 1 — FIRST HEAD DATA (D1)
0 1 0 — SECOND HEAD DATA (D2)
1 0 0 — THIRD HEAD DATA (D3)
FIG. 4C  IMAGE DATA RECEIVED BY SoC(2)
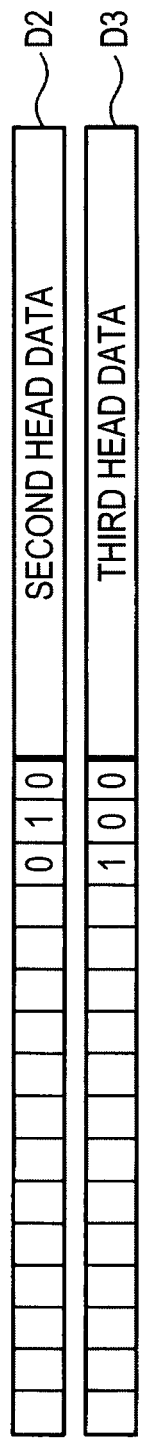
0 1 0 — SECOND HEAD DATA (D2)
1 0 0 — THIRD HEAD DATA (D3)
FIG. 4D  IMAGE DATA RECEIVED BY SoC(3)
1 0 0 — THIRD HEAD DATA (D3)

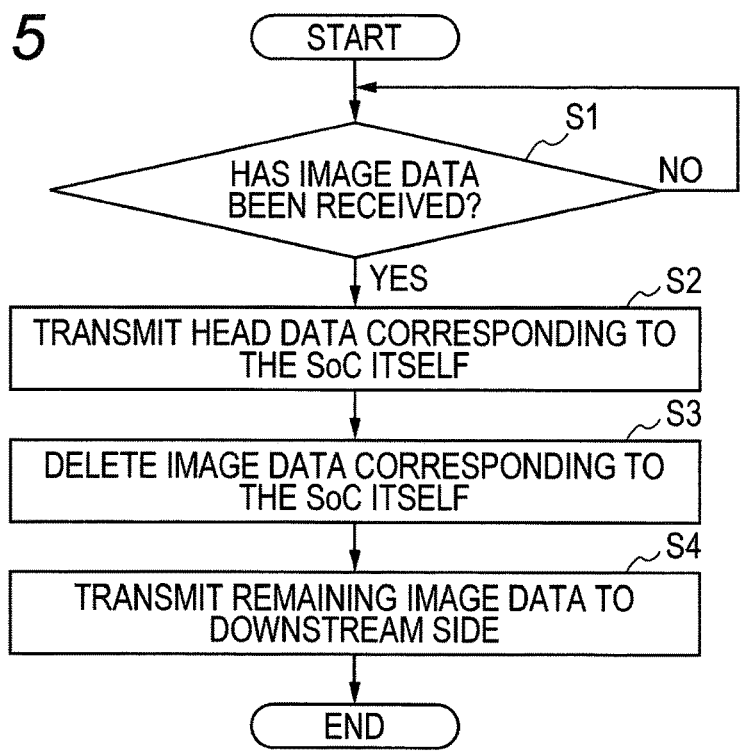
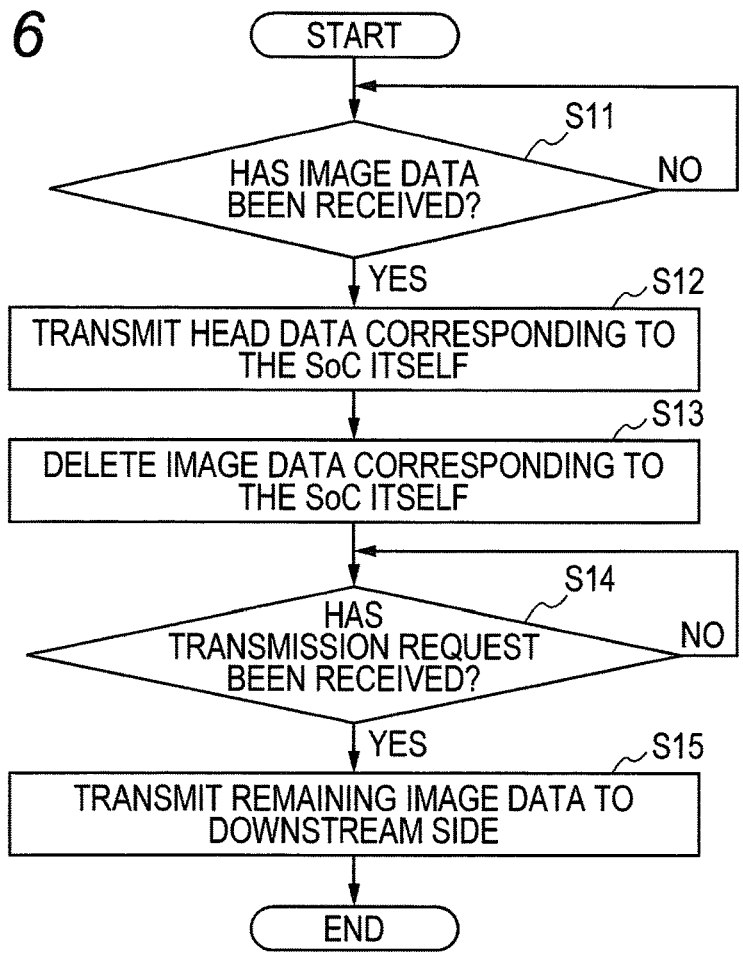

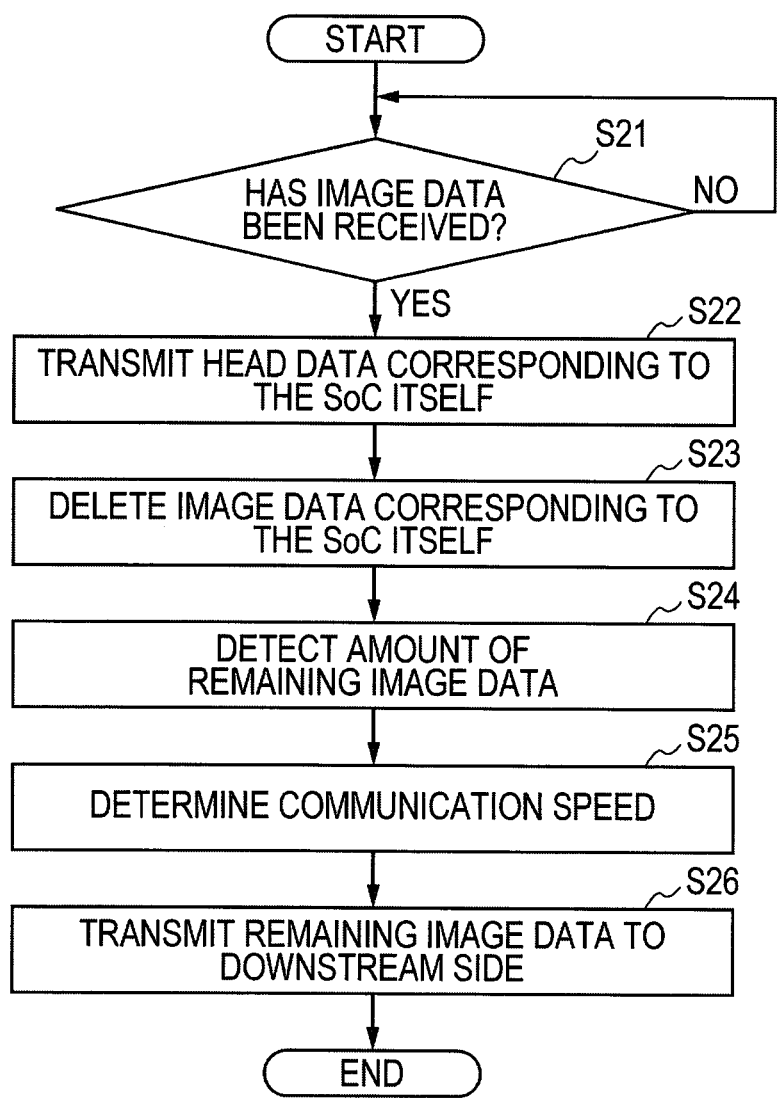

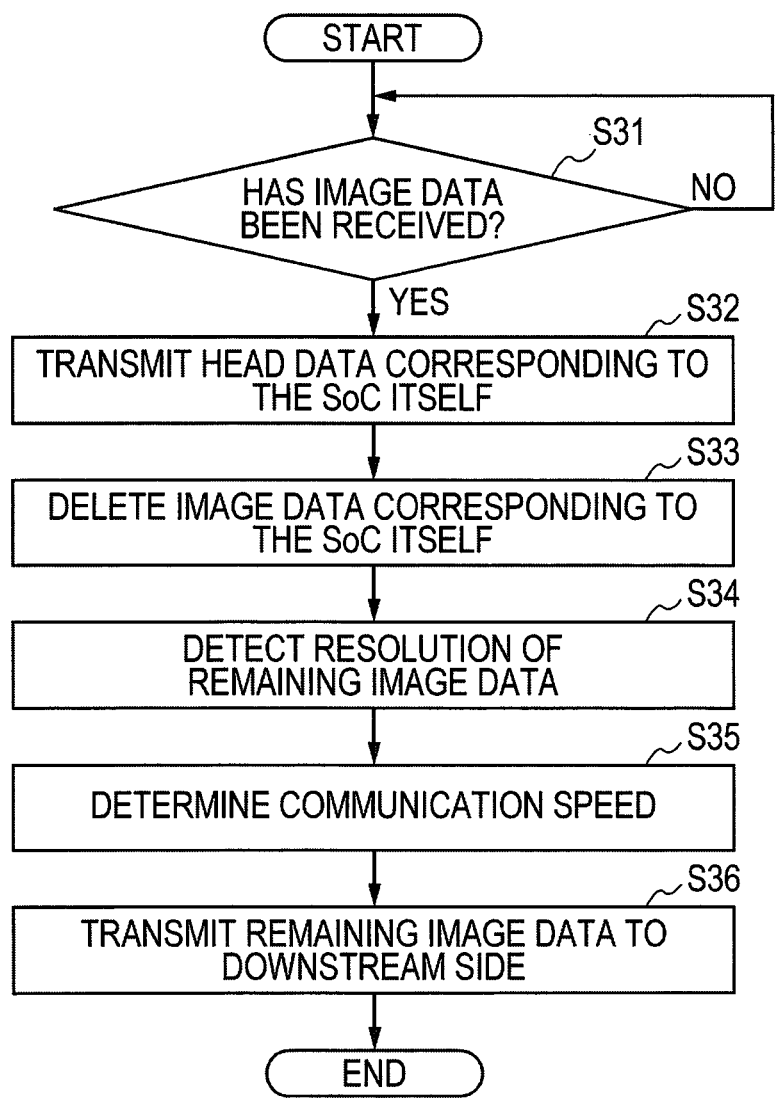

CONTROLLER, HEAD SYSTEM, AND PRINTER

REFERENCE TO RELATED APPLICATIONS

This application claims priority from Japanese Patent Application No. 2021-194273 filed on Nov. 30, 2021. The entire content of the priority application is incorporated herein by reference.

BACKGROUND ART

An image recording apparatus is proposed that includes a controller, a plurality of control boards connected in series, and a plurality of heads controlled respectively by the plurality of control boards.

DESCRIPTION

A controller transmits image data used for driving all heads to a most-upstream control board, and a plurality of control boards sequentially transfer the image data to the downstream side. Each control board extracts only image data used for driving the head controlled by itself. By connecting the plurality of control boards in series, it is unnecessary to connect each of the plurality of control boards to the controller.

The control board transmits image data used for driving all heads. The amount of the image data is larger than the amount of image data extracted by each control board. Transmission of the image data causes noise due to unnecessary radiation. As the size of image data increases, the magnitude of noise tends to increase.

In view of the foregoing, an example of an object of this disclosure is to provide a controller, a head system, a printer, and a data transmission method configured to suppress generation of noise.

According to one aspect, this specification discloses a controller including a plurality of control circuits configured to be connected to respective ones of a plurality of head units. Each of the plurality of head units has a nozzle. The plurality of control circuits includes a first control circuit, a second control circuit, and a third control circuit. The second control circuit is connected to the first control circuit in series to perform communication. Thus, the first control circuit is configured to transmit first data to the second control circuit. The first data is data for controlling at least one of the plurality of head units. The third control circuit is connected to the second control circuit in series to perform communication. Thus, the second control circuit is configured to transmit second data to the third control circuit. The second data is data for controlling at least one of the plurality of head units. A data amount of the second data is smaller than a data amount of the first data. Thus, noise generated during data transmission is suppressed. A head system, a printer, and a data transmission method using such controller are also disclosed.

According to another aspect, this specification also discloses a head system. The head system includes a plurality of head units and a controller. The plurality of head units includes a first head unit, a second head unit, and a third head unit. Each of the plurality of head units has a nozzle. The controller includes a plurality of control circuits connected to respective ones of the plurality of head units. The plurality of control circuits includes a first control circuit, a second control circuit, and a third control circuit. The first control circuit is configured to control the first head unit. The second control circuit is connected to the first control circuit in series to perform communication. The second control circuit is configured to control the second head unit. The third control circuit is connected to the second control circuit in series to perform communication. The third control circuit is configured to control the third head unit. The first control circuit is configured to transmit first data to the second control circuit. The first data is data for controlling at least one of the plurality of head units. The second control circuit is configured to transmit second data to the third control circuit. The second data is data for controlling at least one of the plurality of head units. A data amount of the second data is smaller than a data amount of the first data.

According to still another aspect, this specification also discloses a printer. The printer includes a head system and a conveyor. The head system includes a plurality of head units and a controller. The plurality of head units includes a first head unit, a second head unit, and a third head unit. Each of the plurality of head units has a nozzle. The controller includes a plurality of control circuits connected to respective ones of the plurality of head units. The conveyor is configured to convey a print medium on which printing is performed with liquid ejected from the first head unit, the second head unit, or the third head unit. The plurality of control circuits includes a first control circuit, a second control circuit, and a third control circuit. The first control circuit is configured to control the first head unit. The second control circuit is connected to the first control circuit in series to perform communication. The second control circuit is configured to control the second head unit. The third control circuit is connected to the second control circuit in series to perform communication. The third control circuit is configured to control the third head unit. The first control circuit is configured to transmit first data to the second control circuit. The first data is data for controlling at least one of the plurality of head units. The second control circuit is configured to transmit second data to the third control circuit. The second data is data for controlling at least one of the plurality of head units. A data amount of the second data is smaller than a data amount of the first data.

According to still another aspect, this specification also discloses a data transmission method of transmitting data among a plurality of control circuits connected to respective ones of a plurality of head units. Each of the plurality of head units has a nozzle. The plurality of control circuits includes a first control circuit, a second control circuit connected to the first control circuit in series to perform communication, and a third control circuit connected to the second control circuit in series to perform communication. The data transmission method includes: transmitting first data from the first control circuit to the second control circuit; and transmitting second data from the second control circuit to the third control circuit. The first data is data for controlling at least one of the plurality of head units. The second data is data for controlling at least one of the plurality of head units. A data amount of the second data is smaller than a data amount of the first data.

FIGS. 4A, 4B, 4C and 4D are conceptual diagrams showing an example of a structure of image data.

FIG. 5 is a flowchart for explaining an image data transmission process by an SoC.

FIG. 6 is a flowchart for explaining an image data transmission process by an SoC.

FIG. 7 is a flowchart for explaining an image data transmission process by an SoC.

FIG. 8 is a flowchart for explaining an image data transmission process by an SoC.

Figure 1:
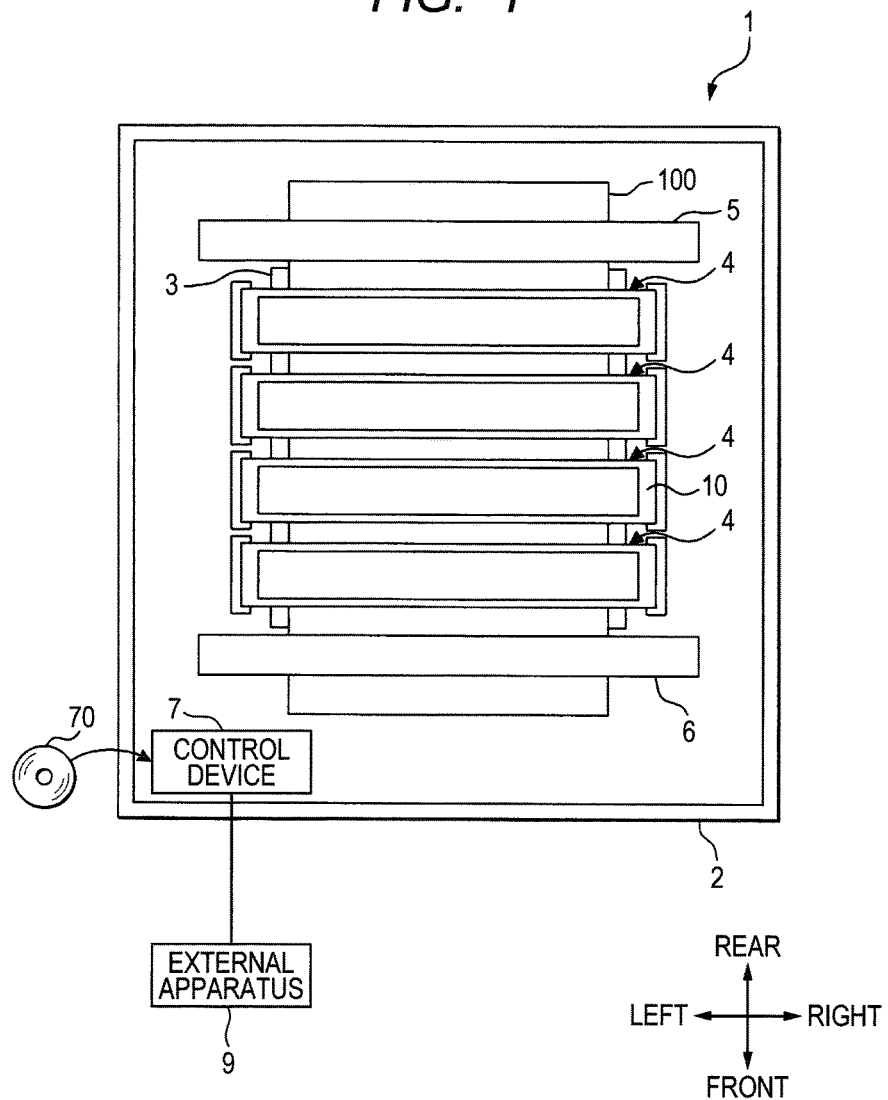
FIG. 1 is a schematic plan view of a printer.

A printer according to a first embodiment will be described below with reference to the drawings. In FIG. 1, a conveyance direction of a recording sheet 100 corresponds to a front-rear direction of a printer 1. A width direction of the recording sheet 100 corresponds to a left-right direction of the printer 1. A direction perpendicular to the front-rear direction and the left-right direction, that is, the direction perpendicular to the drawing surface of FIG. 1 corresponds to an upper-lower direction of the printer 1. The left-right direction corresponds to a first direction, and the front-rear direction corresponds to a second direction.

As shown in FIG. 1, the printer 1 includes a platen 3 accommodated in a case 2, four inkjet heads 4, two conveyance rollers 5 and 6, a control device 7 (controller), and so on. The recording sheet 100 passes over the upper surface of the platen 3. The four inkjet heads 4 are arranged in the conveyance direction above the platen 3. Each inkjet head 4 is a so-called line type head. Ink is supplied to the inkjet head 4 from an ink tank (not shown). Ink of different colors is supplied to the four inkjet heads 4.

As shown in FIG. 1, the two conveyance rollers 5 and 6 are arranged at the rear side and the front side of the platen 3, respectively. The two conveyance rollers 5 and 6 are driven by a motor (not shown) to convey the recording sheet 100 on the platen 3 forward. The two conveyance rollers 5 and 6 are an example of a conveyor.

The control device 7 includes an FPGA, a memory, a RAM, and so on. The memory is rewritable, and is, for example, an EEPROM, an EPROM, a hard disk, and so on. The control device 7 may include a CPU, an ASIC, and so on. A control program is stored in the memory. The control program is installed in the memory from a recording medium 70 such as an optical disc or a portable flash memory. The control program may be downloaded to the memory from a server connected to the printer 1 so as to perform communication. The control device 7 controls the printer 1 based on the control program. The control device 7 is connected to an external apparatus 9 such as a PC so as to perform data communication, and based on print data sent from the external apparatus 9, drives each section of the printer 1 to perform printing.

Figure 2:
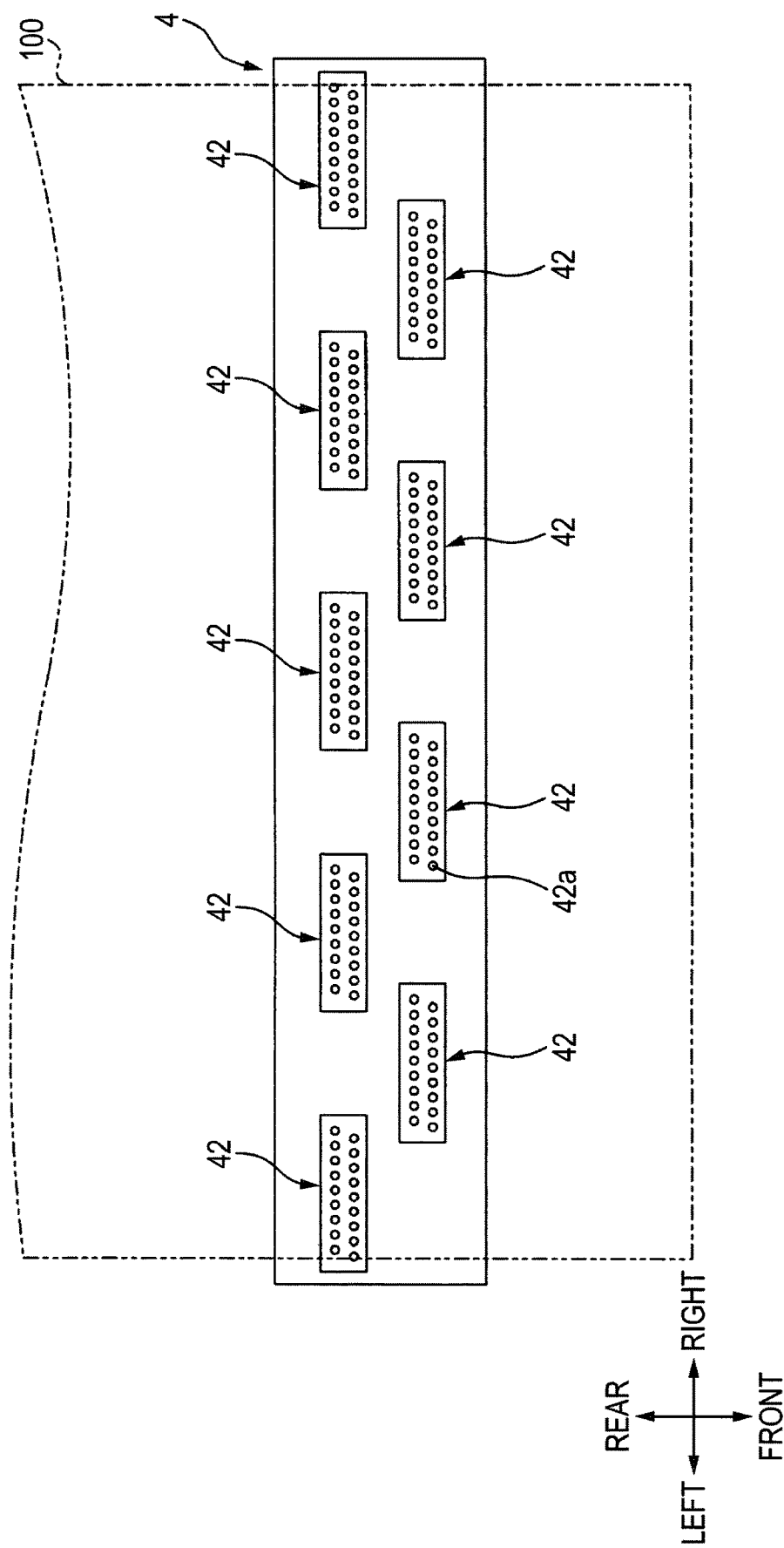
FIG. 2 is a plan view of an inkjet head in which heads are shown for convenience.

As shown in FIG. 2, the inkjet head 4 includes a plurality of heads 42. The head 42 is an example of a head unit. The plurality of heads 42 are arranged in two rows arranged in the front-rear direction. In the front row, four heads 42 are arranged along the left-right direction. In the rear row, five heads 42 are arranged along the left-right direction. A plurality of nozzles 42a are provided on the lower surface of each head 42.

Figure 3:
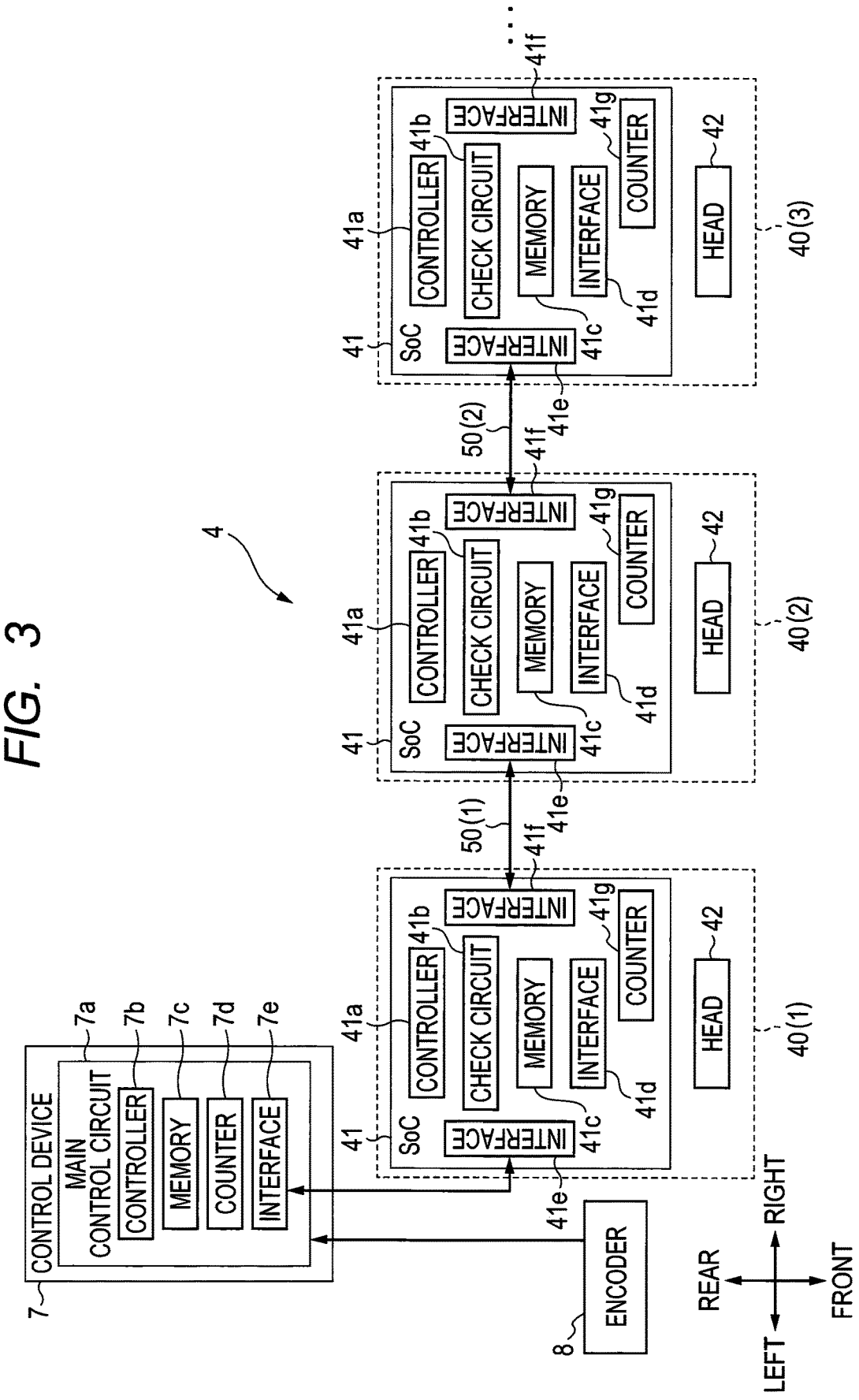
FIG. 3 is a block diagram of a control device, an encoder and the inkjet head.

As shown in FIG. 3, the control device 7 has a main control circuit 7a. The main control circuit 7a includes a controller 7b, a memory 7c, a counter 7d, and an interface (I/F) 7e. The inkjet head 4 has a plurality of head modules 40.

The plurality of head modules 40 includes, for example, a first head module 40(1), a second head module 40(2), a third head module 40(3), . . . , a n-th head module 40(n) (n is a natural number). The first head module 40(1) is located leftmost and the n-th head module 40(n) is located rightmost. The first head module 40(1) is positioned closest to the control device 7 among all the head modules 40, and the n-th head module 40(n) is positioned farthest from the control device 7 among all the head modules 40.

Each of the first head module 40(1) to the n-th head module 40(n) includes an SoC 41 and a head 42. The SoC 41 is an example of a control circuit. The SoC 41 includes a controller 41a, a check circuit 41b, a memory 41c, an interface 41d connected to the head 42, an upstream interface 41e, a downstream interface 41f, and a counter 41g. The check circuit 41b checks whether received data includes head data corresponding to the SoC 41 itself, and stores the head data corresponding to the SoC 41 itself in the memory 41c.

The controller 41a controls the operation of the SoC 41. The controller 41a may include, for example, a CPU, or may include a logic circuit such as an ASIC. The memory 41c is a rewritable non-volatile memory such as EPROM or EEPROM. The counters 7d and 41g are synchronized by, for example, inputting a reset signal from the outside in parallel to each of the counters 7d and 41g. Hereinafter, the SoCs 41 of the head module 40(1) to the n-th head module 40(n) are referred to as SoC(1) to SoC(n).

Each interface 7e, 41e, 41f is an interface configured to perform two-way communication and connected in series by a communication line (communication cable) 50. The communication line 50 includes a first communication line 50(1) connecting the SoC(1) and the SoC(2), and a second communication line 50(2) connecting the SoC(2) and the SoC(3). The interface 7e transmits image data included in print data to the interface 41e of the SoC(1). The interface 41f of the SoC(1) transmits the image data to the interface 41e of the SoC(2), and the interface 41f of the SoC(2) transmits the image data to the interface 41e of the SoC(3). In this manner, the image data is sequentially transmitted to the interface 41e of the SoC(n).

The image data includes an identifier of each of the SoC(1) to the SoC(n) and print information associated with each identifier. Each of the controllers 41a of the SoC(1) to the SoC(n) acquires image information associated with its own identifier from received image data.

The conveyance rollers 5 and 6 are provided with a motor (not shown), and the motor is provided with an encoder 8. The encoder 8 detects the rotational position or speed of the motor. The rotational position or speed of the motor corresponds to the front-rear position of the recording sheet 100. Each time the encoder 8 detects the rotational position or speed corresponding to a print position (a position on the recording sheet 100 at which printing of one line should be performed), the encoder 8 transmits a synchronization signal to the main control circuit 7a.

The main control circuit 7a transmits the synchronization signal to the interface 41e of the SoC(1) as necessary. The interface 41f of the SoC(1) transmits the synchronization signal to the interface 41e of the SoC(2), and the interface 41f of the SoC(2) transmits the synchronization signal to the interface 41e of the SoC(3). In this way, the synchronization signal is sequentially transferred up to the interface 41e of the SoC(n). Each of the SoC(1) to SoC(n) refers to the counter 41g, drives the head 42 at the time indicated by the received synchronization signal, and ejects ink from the nozzles 42a.

A case where the inkjet head 4 includes three SoC(1) to SoC(3), that is, a case of n=3 will be described with reference to FIGS. 4A to 4D. FIG. 4A shows the structure of image data of one packet. The image data includes header bits and data bits. Here, one packet is a unit composed of a set of header bits and data bits.

The header bits store an identifier for identifying each of the SoC(1) to SoC(3), that is, header information. The header bits contain multiple bits, for example 16 bits. In the header bits, the bits at the right side indicate lower bits and the bits at the left side indicate higher bits. Hereinafter, the least significant bit will be referred to as a first bit, and the bits will be referred to as a second bit, a third bit, ..., a 16th bit toward the higher bit. The header bits may be 15 bits or less, or may be 17 bits or more.

The header information of the SoC(1) is "001" in which "1" is stored in the first bit, "0" is stored in the second bit, and "0" is stored in the third bit. The header information of the SoC(2) is "010" in which "0" is stored in the first bit, "1" is stored in the second bit, and "0" is stored in the third bit. The header information of the SoC(3) is "100" in which "0" is stored in the first bit, "0" is stored in the second bit, and "1" is stored in the third bit.

The data bits store print information associated with the identifier, that is, head data. The head data is data for controlling the head 42. The controller 41a of the SoC 41 transmits head data to the interface 41d. The head 42 receives the head data from the interface 41d and drives based on the head data. The head data associated with the identifier of the SoC(1) is referred to as first head data, the head data associated with the identifier of the SoC(2) is referred to as second head data, and the head data associated with the identifier of the SoC(3) is referred to as third head data.

As shown in FIG. 4B, the SoC(1) receives three packets of image data from the main control circuit 7a. The three packets of image data correspond to basic data. The three packets of image data include first image data D1, second image data D2, and third image data D3. The first image data D1 includes header information "001" for identifying the SoC(1) and first head data. The second image data D2 includes header information "010" for identifying the SoC(2) and second head data. The third image data D3 includes header information "100" identifying the SoC(3) and third head data.

The SoC (1) transmits the head data corresponding to itself, that is, the first head data to the interface 41d, and deletes the entire first image data D1. That is, the SoC(1) deletes the header information "001" and the first head data. The SoC(1) transmits the second image data D2 and the third image data D3 to the SoC(2). The second image data D2 and the third image data D3 are an example of first data.

As shown in FIG. 4C, the SoC(2) receives two packets of image data, that is, the second image data D2 and the third image data D3, from the SoC(1). The SoC(2) transmits the head data corresponding to itself, that is, the second head data to the interface 41d, and deletes the entire second image data D2. That is, the SoC(2) deletes the header information "010" and the second head data. The SoC(2) transmits the third image data D3 to the SoC(3). The third image data D3 is an example of second data.

As shown in FIG. 4D, the SoC(3) receives one packet of image data, that is, the third image data D3 from the SoC(2). The SoC(3) transmits the head data corresponding to itself, that is, third head data, to the interface 41d. The SoC(3) is the most downstream SoC 41, and may or may not delete the entire third image data D3. The SoC(3) transmits, to the main control circuit 7a, a notification indicating that the image data has been received. If the main control circuit 7a does not receive the notification from the SoC(3) within a particular time, the main control circuit 7a may resend the three packets of image data to the SoC(1).

As described above, the SoC(k) (k=1 to n−2) deletes the image data corresponding to itself from the received image data, and transmits the remaining image data to the SoC(k+1). The SoC(k+1) deletes the image data corresponding to itself from the received image data, and transmits the remaining image data to the SoC(k+2). That is, the amount of data transmitted from the SoC(k+1) to the SoC(k+2) is smaller than the amount of data transmitted from the SoC(k) to the SoC(k+1).

An image data transmission process by the SoC 41 will be described with reference to the flowchart of FIG. 5. The image data transmission process is executed by the SoC(1) to the SoC(n−1). That is, the SoCs 41 other than the most downstream SoC(n) execute the image data transmission process. The SoC 41 determines whether image data has been received (S1). If image data has not been received (S1: NO), the SoC 41 returns the process to step S1. If image data has been received (S1: YES), the SoC 41 transmits head data corresponding to itself, that is, the head data of a packet containing its own identifier to the interface 41d (S2). The SoC 41 deletes the image data corresponding to itself (S3), transmits the remaining image data to the downstream SoC 41 (S4), and ends the process. Note that the most downstream SoC 41(n) executes steps S1 to S3 and does not execute step S4.

In the printer 1 according to the first embodiment, the amount of data transmitted from the SoC(k+1) to the SoC (k+2) is smaller than the amount of data transmitted from the SoC(k) to the SoC(k+1), so that noise that occurs during data transmission is suppressed. Conventionally, the SoC(k) transmits image data to the SoC(k+1) without deleting the image data corresponding to itself from the received image data. Further, the conventional SoC(k+1) transmits image data to the SoC(k+2) without deleting the image data corresponding to itself from the received image data, similarly to the SoC(k). Thus, image data unnecessary for the SoC (k+2), that is, image data corresponding to the SoC(k) and image data corresponding to the SoC(k+1) are transmitted to the SoC(k+2). Thus, the unnecessary image data causes an increase in noise due to unnecessary radiation. In the first embodiment, transmission of unnecessary image data is prevented, and noise generated during data transmission is suppressed.

A printer according to a second embodiment will be described below with reference to the drawings. Among the configurations of the second embodiment, the configurations similar to those of the first embodiment are denoted by the same reference numerals, and detailed description thereof will be omitted. In the second embodiment, the SoC 41 at the upstream side transmits image data to the SoC 41 at the downstream side in response to receiving a transmission request for image data from the SoC 41 at the downstream side. For example, in response to receiving a transmission request for the first data from the SoC(2), the SoC(1) transmits the first data to the SoC(2). In response to receiving a transmission request for the second data from the SoC(3), the SoC (2) transmits the second data to the SoC(3).

An image data transmission process by the SoC 41 will be described with reference to the flowchart of FIG. 6. The image data transmission process is executed by the SoC(1) to the SoC(n−1). That is, the SoCs 41 other than the most downstream SoC(n) execute the image data transmission process. The SoC 41 determines whether image data has been received (S11). If image data has not been received (S11: NO), the SoC 41 returns the process to step S11. If image data has been received (S11: YES), the SoC 41 transmits head data corresponding to itself, that is, the head data of a packet containing its own identifier to the interface 41*d* (S12). The SoC 41 deletes the image data corresponding to itself (S13), and determines whether there is a transmission request from the downstream SoC 41 (S14). If there is no transmission request from the SoC 41 at the downstream side (S14: NO), the SoC 41 returns the process to step S14. If a transmission request has been received from the downstream SoC 41 (S14: YES), the SoC 41 transmits the remaining image data to the downstream SoC 41 (S15) and ends the process. Note that the most downstream SoC 41(*n*) executes steps S11 to S13 and does not execute steps S14, S15.

A printer 1 according to a third embodiment will be described below. Among the configurations according to the third embodiment, the configurations similar to those in the first or second embodiment are denoted by the same reference numerals, and detailed descriptions thereof are omitted.

In the third embodiment, the communication speed when transmitting image data from the SoC(2) to the SoC(3) is lower than the communication speed when transmitting image data from the SoC(1) to the SoC(2). That is, each SoC 41 at the transmitting side (upstream side) sets the communication speed such that the communication speed decreases as the amount of data to be transmitted decreases. The SoC 41 applies the amount of image data to be transmitted to a function indicating the relationship between the amount of data and the communication speed, such as a proportional function or a quadratic function, and determines the communication speed.

In the printer according to the third embodiment, when the amount of data is small, the image data is transmitted at a lower speed than when the amount of data is large, thereby suppressing the generation of noise due to unnecessary radiation. When the amount of data is small, the transmission time does not tend to be long even if it is transmitted at a low speed. Unnecessary radiation occurs more as the amount of data increases, and as the data transmission speed increases. In the third embodiment, by reducing the amount of data to be transmitted and further reducing the communication speed, the occurrence of unnecessary radiation is further suppressed.

A printer 1 according to a fourth embodiment will be described below. Among the configurations according to the fourth embodiment, the configurations similar to those in the first to third embodiments are denoted by the same reference numerals, and detailed descriptions thereof are omitted.

In the fourth embodiment, the communication speed based on the communication standard of the second communication line 50(2) is lower than the communication speed based on the communication standard of the first communication line 50(1). As an example, in a case where the communication standard of the second communication line 50(2) is PCI Express 3.0, the communication standard of the first communication line 50(1) is PCI Express 4.0. As another example, in a case where the communication standard of the second communication line 50(2) is 5GBASE-T, the communication standard of the first communication line 50(1) is 10GBASE-T. That is, the speed for transmitting the second data, which has a smaller amount of data than the first data, is lower than the speed for transmitting the first data. In the third embodiment, the communication speed is logically set such that the communication speed decreases as the amount of data to be transmitted decreases. In the fourth embodiment, the communication speed is physically set such that the communication speed decreases as the amount of data to be transmitted decreases.

A printer 1 according to a fifth embodiment will be described below with reference to the drawing. Among the configurations according to the fifth embodiment, the configurations similar to those in the first to fourth embodiments are denoted by the same reference numerals, and detailed descriptions thereof are omitted. In the fifth embodiment, the communication standard of the first communication line 50(1) is the same as the communication standard of the second communication line 50(2). Further, the maximum speed guaranteed by the communication standard of the first communication line 50(1) is the same as the maximum speed guaranteed by the communication standard of the second communication line 50(2). The SoC 41 at the transmitting side detects the amount of image data to be transmitted, and reduces the actual communication speed as the detected amount of data decreases.

An image data transmission process by the SoC 41 will be described with reference to the flowchart of FIG. 7. The image data transmission process is executed by the SoC(1) to the SoC(n−1). That is, the SoCs 41 other than the most downstream SoC(n) execute the image data transmission process. The SoC 41 determines whether image data has been received (S21). If image data has not been received (S21: NO), the SoC 41 returns the process to step S21. If image data has been received (S21: YES), the SoC 41 transmits head data corresponding to itself, that is, the head data of a packet containing its own identifier to the interface 41*d* (S22).

The SoC 41 deletes the image data corresponding to itself (S23). The SoC 41 detects the amount of remaining image data (S24). The SoC 41 determines the communication speed for communication with the downstream SoC 41 based on the amount of the remaining image data (S25). The SoC 41 determines the communication speed such that the communication speed decreases as the detected amount of data decreases. The SoC 41 transmits the remaining image data to the downstream SoC 41 at the determined communication speed (S26), and ends the process. Note that the most downstream SoC 41(*n*) executes steps S21 to S23 and does not execute steps S24 to S26.

The SoC 41 applies the detected amount of data to a function indicating the relationship between the amount of data and the communication speed, such as a proportional function or a quadratic function, and determines the communication speed. Alternatively, the SoC 41 may determine the communication speed based on thresholds for the amount of data. For example, a first threshold, a second threshold, and a third threshold (first threshold<second threshold<third threshold) are stored in advance in the memory 41*c*. If the detected amount of data is less than the first threshold, the SoC 41 may determine the communication speed to be a first speed. If the detected amount of data is greater than or equal to the first threshold and less than the second threshold, the SoC 41 may determine the communication speed to be a second speed higher than the first speed. If the detected amount of data is greater than or equal to the second threshold and less than the third threshold, the SoC 41 may determine the communication speed to be a third speed higher than the second speed. If the detected amount of data is greater than or equal to the third threshold, the SoC 41 may determine the communication speed to be a fourth speed higher than the third speed.

A printer 1 according to a sixth embodiment will be described below with reference to the drawing. Among the configurations according to the sixth embodiment, the configurations similar to those in the first to fifth embodiments are denoted by the same reference numerals, and detailed descriptions thereof are omitted. In the sixth embodiment, the SoC 41 detects the resolution of image data to be transmitted, and reduces the communication speed as the detected resolution decreases.

An image data transmission process by the SoC 41 will be described with reference to the flowchart of FIG. 8. The image data transmission process is executed by the SoC(1) to the SoC(n−1). That is, the SoCs 41 other than the most downstream SoC(n) execute the image data transmission process. The SoC 41 determines whether image data has been received (S31). If image data has not been received (S31: NO), the SoC 41 returns the process to step S31. If image data has been received (S31: YES), the SoC 41 transmits head data corresponding to itself, that is, the head data of a packet containing its own identifier to the interface 41$d$ (S32).

The SoC 41 deletes the image data corresponding to itself (S33). The SoC 41 detects the resolution of the remaining image data (S34). The SoC 41 determines the communication speed for communication with the downstream SoC 41 according to the resolution of the remaining image data (S35). The SoC 41 determines the communication speed such that the communication speed decreases as the detected resolution decreases. The SoC 41 transmits the remaining image data to the downstream SoC 41 at the determined communication speed (S36), and ends the process. Note that the most downstream SoC 41($n$) executes steps S31 to S33 and does not execute steps S34 to S36.

The SoC 41 applies the detected resolution to a function indicating the relationship between the resolution and the communication speed, such as a proportional function or a quadratic function, and determines the communication speed. Alternatively, the SoC 41 may determine the communication speed based on thresholds for the resolution. For example, a first threshold, a second threshold, and a third threshold (first threshold <second threshold <third threshold) are stored in advance in the memory 41$c$. If the detected resolution is less than the first threshold, the SoC 41 may determine the communication speed to be a first speed. If the detected resolution is greater than or equal to the first threshold and less than the second threshold, the SoC 41 may determine the communication speed to be a second speed higher than the first speed. If the detected resolution is greater than or equal to the second threshold and less than the third threshold, the SoC 41 may determine the communication speed to be a third speed higher than the second speed. If the detected resolution is greater than or equal to the third threshold, the SoC 41 may determine the communication speed to be a fourth speed higher than the third speed.

That is, the SoC(1) reduces the transmission speed of the second image data as the resolution of the second image data decreases. The SoC(2) reduces the transmission speed of the third image data as the resolution of the third image data decreases.

In the printer according to the sixth embodiment, when the resolution is low, the image data is transmitted at a lower speed than when the resolution is high, so that noise due to unnecessary radiation is suppressed. When the resolution is low, the amount of data tends to be smaller than when the resolution is high. Thus, even if transmission is performed at a low speed, the transmission time is unlikely to become long.

A printer 1 according to a seventh embodiment will be described below with reference to the drawing. Among the configurations according to the seventh embodiment, the configurations similar to those in the first to sixth embodiments are denoted by the same reference numerals, and detailed descriptions thereof are omitted. In the seventh embodiment, the SoC 41 detects the compression ratio of image data to be transmitted, and reduces the communication speed as the detected compression ratio increases.

Figure 9:
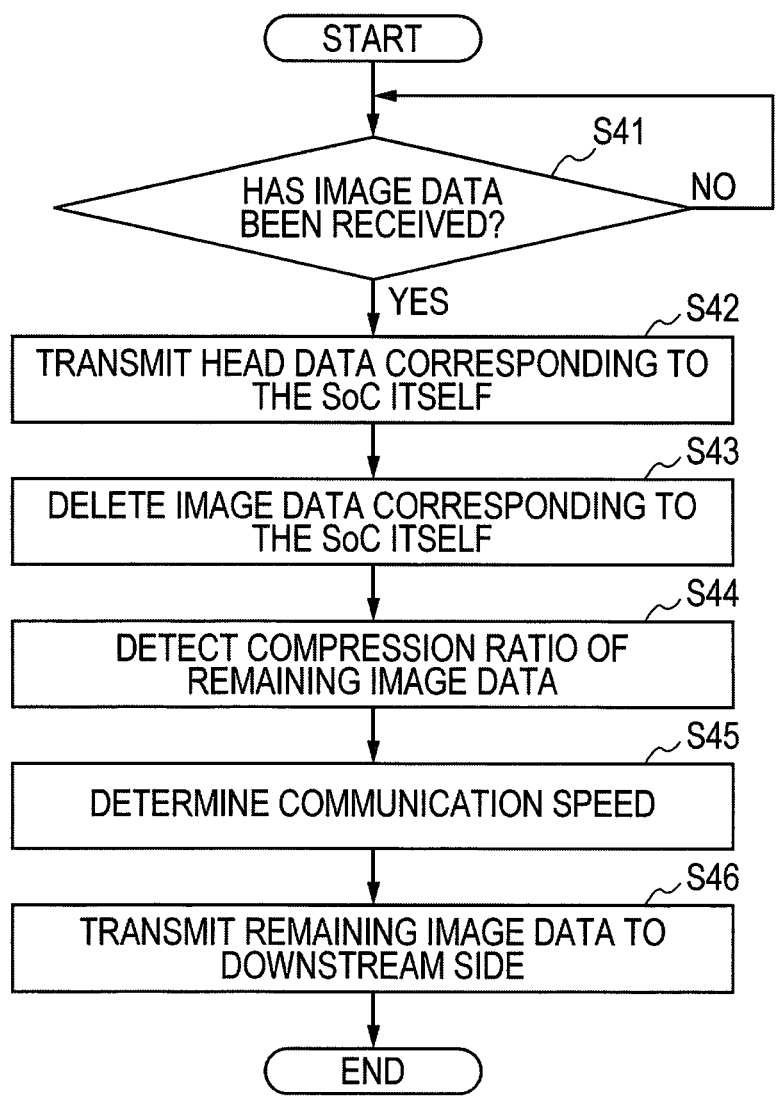
FIG. 9 is a flowchart for explaining an image data transmission process by an SoC.

An image data transmission process by the SoC 41 will be described with reference to the flowchart of FIG. 9. The image data transmission process is executed by the SoC(1) to the SoC(n−1). That is, the SoCs 41 other than the most downstream SoC(n) execute the image data transmission process. The SoC 41 determines whether image data has been received (S41). If image data has not been received (S41: NO), the SoC 41 returns the process to step S41. If image data has been received (S41: YES), the SoC 41 transmits head data corresponding to itself, that is, the head data of a packet containing its own identifier to the interface 41$d$ (S42).

The SoC 41 deletes the image data corresponding to itself (S43). The SoC 41 detects the compression ratio of the remaining image data (S44). The SoC 41 determines the communication speed for communication with the downstream SoC 41 according to the compression ratio of the remaining image data (S45). The SoC 41 determines the communication speed such that the communication speed decreases as the detected compression ratio increases (that is, as the data size decreases). The SoC 41 transmits the remaining image data to the downstream SoC 41 at the determined communication speed (S46), and ends the process. Note that the most downstream SoC 41($n$) executes steps S41 to S43 and does not execute steps S44 to S46.

The SoC 41 applies the detected compression ratio to a function indicating the relationship between the compression ratio and the communication speed, such as a proportional function or a quadratic function, and determines the communication speed. Alternatively, the SoC 41 may determine the communication speed based on thresholds for the compression ratio. For example, a first threshold, a second threshold, and a third threshold (first threshold <second threshold <third threshold) are stored in advance in the memory 41$c$. If the detected compression ratio is less than the first threshold, the SoC 41 may determine the communication speed to be a fourth speed. If the detected compression ratio is greater than or equal to the first threshold and less than the second threshold, the SoC 41 may determine the communication speed to be a third speed lower than the fourth speed. If the detected compression ratio is greater than or equal to the second threshold and less than the third threshold, the SoC 41 may determine the communication speed to be a second speed lower than the third speed. If the detected compression ratio is greater than or equal to the third threshold, the SoC 41 may determine the communication speed to be a first speed lower than the second speed.

That is, the SoC(1) decreases the transmission speed of the first data as the compression ratio of the first data increases, and the SoC(2) decreases the transmission speed of the second data as the compression ratio of the second data increases. In other words, the SoC(1) increases the transmission speed of the first data as the compression ratio of the first data decreases, and the SoC(2) increases the transmission speed of the second data as the compression ratio of the second data decreases.

In the printer according to the seventh embodiment, when the compression ratio is high, image data is transmitted at a lower speed than when the compression ratio is low, so that the generation of noise due to unnecessary radiation is suppressed. When the compression ratio is high, the amount of data tends to be smaller than when the compression ratio is low. Thus, even if transmission is performed at a low speed, the transmission time is unlikely to become long.

A printer 1 according to an eighth embodiment will be described below with reference to the drawing. Among the configurations according to the eighth embodiment, the configurations similar to those in the first to seventh embodiments are denoted by the same reference numerals, and detailed descriptions thereof are omitted. In the eighth embodiment, when retransmitting image data after transmitting the image data, the SoC 41 makes the communication speed during retransmission higher than the communication speed during the transmission.

In response to receiving image data, the SoC 41 stores the received image data in a first storage area of the memory 41*c*. In response to receiving image data next, the SoC 41 stores the previously received image data stored in the first storage area, into a second storage area of the memory 41*c* which is different from the first storage area. That is, the SoC 41 moves the image data received last time from the first storage area to the second storage area. The SoC 41 stores the image data received this time in the first storage area, that is, overwrites the first storage area. For example, if the SoC 41 at the transmitting side has not received a reception confirmation from the SoC 41 at the receiving side for a particular time since the image data was transmitted, the SoC 41 at the transmitting side retransmits the image data to the SoC 41 at the receiving side. In this case, the SoC 41 at the receiving side moves the previously received data stored in the first storage area to the second storage area, and overwrites the first storage area with the image data received this time. If the image data received two times before is stored in the second storage area, the SoC 41 overwrites the second storage area with the image data received last time.

Occasionally, the SoC 41 does not receive a response that image data has been received, from the downstream SoC 41, due to radiation noise and so on, although the downstream SoC 41 has actually received the image data. In this case, the SoC 41 transmits, to the main control circuit 7*a*, a retransmission request of image data for the downstream SoCs 41, and thus receive the same image data as the image data received last time. Thus, in response to receiving image data, the SoC 41 determines whether the image data received this time is the same as the image data received last time. In response to determining that the image data received this time is the same as the image data received last time, the SoC 41 stores a retransmission flag in the memory 41*c*, that is, sets the retransmission flag. The retransmission flag is one (1), for example. In response to determining that the image data received this time is not the same as the image data received last time, the SoC 41 stores a non-retransmission flag in the memory 41*c*, that is, sets the non-retransmission flag. The non-retransmission flag is zero (0), for example.

Figure 10:
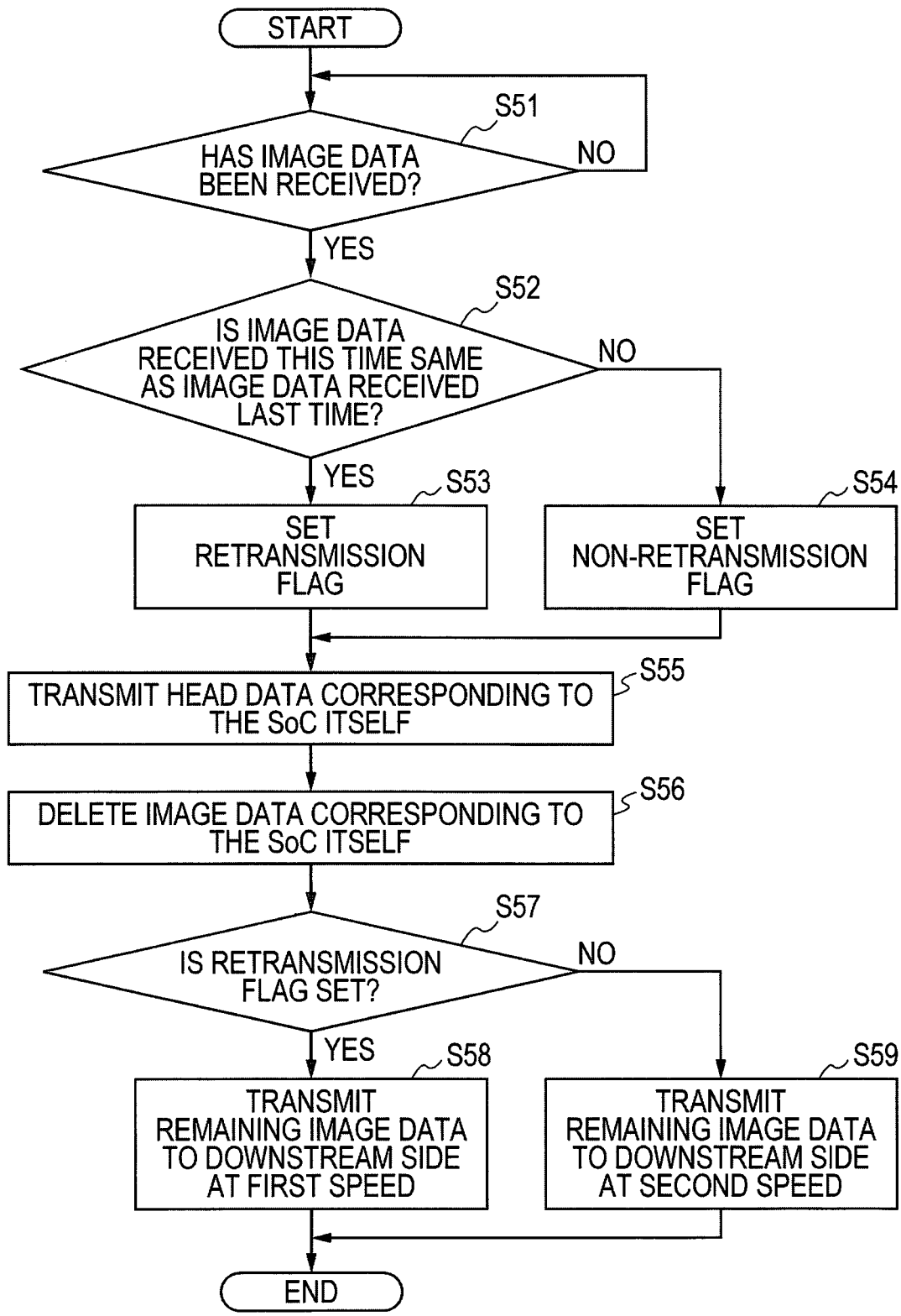
FIG. 10 is a flowchart for explaining an image data transmission process by an SoC.

An image data transmission process by the SoC 41 will be described with reference to the flowchart of FIG. 10. The SoC 41 determines whether image data has been received (S51). If image data has not been received (S51: NO), the SoC 41 returns the process to step S51. If image data has been received (S51: YES), the SoC 41 determines whether the image data received this time is the same as the image data received last time (S52). In response to determining that the image data received this time is the same as the image data received last time (S52: YES), the SoC 41 sets a retransmission flag in the memory 41*c* (S53). In response to determining that the image data received this time is not the same as the image data received last time (S52: NO), the SoC 41 sets a non-retransmission flag in the memory 41*c* (S54).

After step S53 or S54, the SoC 41 transmits the head data corresponding to itself, that is, the head data of a packet storing its own identifier to the interface 41*d* (S55). The SoC 41 deletes the image data corresponding to itself (S56). The SoC 41 refers to the memory 41*c* and determines whether the retransmission flag is set (S57).

If the retransmission flag is set (S57: YES), the SoC 41 transmits the remaining image data to the downstream side at a first speed (S58), and ends the process. If the retransmission flag is not set (S57: NO), that is, if the non-retransmission flag is set, the SoC 41 transmits the remaining image data to the downstream side at a second speed lower than the first speed (S59) and ends the process.

That is, when the SoC(1) retransmits the first data after transmitting the first data, the transmission speed during retransmission of the first data is higher than the transmission speed during transmission of the first data. When the SoC(2) retransmits the second data after transmitting the second data, the transmission speed during the retransmission of the second data is higher than the transmission speed during the transmission of the second data.

In the printer according to the eighth embodiment, when the retransmission flag is set, that is, when the image data is retransmitted, the image data is transmitted at the first speed higher than the second speed to complete the retransmission process in a short time.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention may be provided as appropriate.

What is claimed is:

1. A controller comprising a plurality of control circuits configured to be connected to respective ones of a plurality of head units, each of the plurality of head units having a nozzle, the plurality of head units including a first head unit, the plurality of control circuits including:
  a first control circuit, the first control circuit including a first interface for connecting to the first head unit;
  a second control circuit connected to the first control circuit in series to perform communication; and
  a third control circuit connected to the second control circuit in series to perform communication,
 the first control circuit being configured to:
  receive basic data for controlling at least one of the plurality of head units, the basic data including first head data for controlling the first head unit;
  transmit the first head data to the first interface;
  delete the first head data from the basic data; and
  transmit first data to the second control circuit, the first data being obtained by deleting the first head data from the basic data, the first data being data for controlling at least one of the plurality of head units, the second control circuit being configured to transmit second data to the third control circuit, the second data being data for controlling at least one of the plurality of head units,
a data amount of the second data being smaller than a data amount of the first data.

2. The controller according to claim 1, wherein the plurality of head units includes a second head unit;
wherein the first data includes second head data for controlling the second head unit;
wherein the second control circuit is configured to transmit a transmission request for the first data to the first control circuit; and
wherein the first control circuit is configured to, in response to receiving the transmission request for the first data, transmit the first data to the second control circuit.

3. The controller according to claim 1, wherein the plurality of head units includes a second head unit;
wherein the second control circuit includes a second interface for connecting to the second head unit;
wherein the first data includes second head data for controlling the second head unit; and
wherein the second control circuit is configured to:
transmit the second head data to the second interface;
delete the second head data from the first data; and
transmit the second data to the third control circuit, the second data being obtained by deleting the second head data from the first data.

4. The controller according to claim 3, wherein the plurality of head units includes a third head unit;
wherein the second data includes third head data for controlling the third head unit;
wherein the third control circuit is configured to transmit a transmission request for the second data to the second control circuit; and
wherein the second control circuit is configured to, in response to receiving the transmission request for the second data, transmit the second data to the third control circuit.

5. The controller according to claim 3, wherein the first control circuit is configured to:
after deleting the first head data from the basic data, detect the data amount of the first data;
determine a first speed for communication with the second control circuit based on the data amount of the first data; and
transmit the first data to the second control circuit at the first speed; and wherein the second control circuit is configured to:
after deleting the second head data from the first data, detect the data amount of the second data;
determine a second speed for communication with the third control circuit based on the data amount of the second data; and
transmit the second data to the third control circuit at the second speed, the second speed being lower than the first speed.

6. The controller according to claim 1, wherein a communication speed from the second control circuit to the third control circuit is lower than a communication speed from the first control circuit to the second control circuit.

7. The controller according to claim 6, further comprising:
a first communication line connecting the first control circuit and the second control circuit; and
a second communication line connecting the second control circuit and the third control circuit,
wherein a speed based on a communication standard of the second communication line is lower than a speed based on a communication standard of the first communication line.

8. The controller according to claim 1, wherein each of a communication speed from the first control circuit to the second control circuit and a communication speed from the second control circuit to the third control circuit becomes lower as a data amount decreases.

9. The controller according to claim 8, further comprising:
a first communication line connecting the first control circuit and the second control circuit; and
a second communication line connecting the second control circuit and the third control circuit,
wherein a communication standard of the first communication line is same as a communication standard of the second communication line;
wherein a communication speed from the first control circuit to the second control circuit is a first speed; and
wherein a communication speed from the second control circuit to the third control circuit is a second speed lower than the first speed.

10. The controller according to claim 1, wherein the basic data includes first image data;
wherein the first data includes second image data;
wherein the second data includes third image data;
wherein the first control circuit is configured to reduce a speed of transmitting the second image data as a resolution of the second image data decreases; and
wherein the second control circuit is configured to reduce a speed of transmitting the third image data as a resolution of the third image data decreases.

11. The controller according to claim 1, wherein the first control circuit is configured to increase a speed of transmitting the first data as a compression ratio of the first data decreases; and
wherein the second control circuit is configured to increase a speed of transmitting the second data as a compression ratio of the second data decreases.

12. The controller according to claim 1, wherein, when the first control circuit retransmits the first data after transmitting the first data, a speed of retransmitting the first data is higher than a speed of transmitting the first data; and
wherein, when the second control circuit retransmits the second data after transmitting the second data, a speed of retransmitting the second data is higher than a speed of transmitting the second data.

13. A head system comprising:
a plurality of head units including a first head unit, a second head unit, and a third head unit, each of the plurality of head units having a nozzle; and
a controller including a plurality of control circuits connected to respective ones of the plurality of head units, the plurality of control circuits including:
a first control circuit configured to control the first head unit, the first control circuit including a first interface for connecting to the first head unit;
a second control circuit connected to the first control circuit in series to perform communication, the second control circuit being configured to control the second head unit; and
a third control circuit connected to the second control circuit in series to perform communication, the third control circuit being configured to control the third head unit,
the first control circuit being configured to:

receive basic data for controlling at least one of the plurality of head units, the basic data including first head data for controlling the first head unit;
transmit the first head data to the first interface;
delete the first head data from the basic data; and
transmit first data to the second control circuit, the first data being obtained by deleting the first head data from the basic data, the first data being data for controlling at least one of the plurality of head units, the second control circuit being configured to transmit second data to the third control circuit, the second data being data for controlling at least one of the plurality of head units, a data amount of the second data being smaller than a data amount of the first data.

14. A printer comprising:

a head system including:
   a plurality of head units including a first head unit, a second head unit, and a third head unit, each of the plurality of head units having a nozzle; and
   a controller including a plurality of control circuits connected to respective ones of the plurality of head units; and a conveyor configured to convey a print medium on which printing is performed with liquid ejected from the first head unit, the second head unit, or the third head unit, the plurality of control circuits including:

a first control circuit configured to control the first head unit, the first control circuit including a first interface for connecting to the first head unit;
   a second control circuit connected to the first control circuit in series to perform communication, the second control circuit being configured to control the second head unit; and
   a third control circuit connected to the second control circuit in series to perform communication, the third control circuit being configured to control the third head unit, the first control circuit being configured to;
   receive basic data for controlling at least one of the plurality of head units, the basic data including first head data for controlling the first head unit;
   transmit the first head data to the first interface;
   delete the first head data from the basic data; and
   transmit first data to the second control circuit, the first data being obtained by deleting the first head data from the basic data, the first data being data for controlling at least one of the plurality of head units, the second control circuit being configured to transmit second data to the third control circuit, the second data being data for controlling at least one of the plurality of head units, a data amount of the second data being smaller than a data amount of the first data.

\* \* \* \* \*